United States Patent
Kurosaki

(10) Patent No.: US 9,513,539 B2
(45) Date of Patent: *Dec. 6, 2016

(54) LIGHT SOURCE UNIT HAVING A MICROLENS ARRAY FOR CONVERTING EXCITATION LIGHT INTO PLURAL LIGHT RAY BUNDLES AND PROJECTOR INCLUDING THE LIGHT SOURCE UNIT

(71) Applicant: CASIO COMPUTER CO. LTD., Tokyo (JP)

(72) Inventor: Hideyuki Kurosaki, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/633,329

(22) Filed: Feb. 27, 2015

(65) Prior Publication Data
US 2015/0168820 A1 Jun. 18, 2015

Related U.S. Application Data

(62) Division of application No. 13/070,785, filed on Mar. 24, 2011, now Pat. No. 8,985,783.

(30) Foreign Application Priority Data

Mar. 24, 2010 (JP) .................. 2010-067134

(51) Int. Cl.
G03B 21/20 (2006.01)
G03B 21/14 (2006.01)
(Continued)

(52) U.S. Cl.
CPC ............... *G03B 21/204* (2013.01); *F21K 9/64* (2016.08); *F21V 9/16* (2013.01); *F21V 13/02* (2013.01); *G03B 21/14* (2013.01); *G03B 21/208* (2013.01); *F21Y 2101/00* (2013.01); *F21Y 2115/30* (2016.08); *G02B 27/0961* (2013.01); *G03B 21/2033* (2013.01)

(58) Field of Classification Search
CPC ............ G03B 21/204; G03B 21/2033; G02B 27/0961; H04N 9/3152
See application file for complete search history.

(56) References Cited

U.S. PATENT DOCUMENTS 7,070,300 B2 * 7/2006 Harbers ............. G02B 27/1046
257/E33.071
7,547,114 B2 * 6/2009 Li ......................... G03B 33/06
353/20

(Continued)

FOREIGN PATENT DOCUMENTS

JP 2004-341105 A 12/2004

*Primary Examiner* — Bao-Luan Le
(74) *Attorney, Agent, or Firm* — Holtz, Holtz, Volek PC

(57) ABSTRACT

To provide a projector which enables a stable projection for a long period of time, there is provided a projector comprising a light source unit, a display device, a projection-side optical system, a light guiding optical system and a projector control unit, wherein the light source unit comprises an excitation light source unit comprising an excitation light source and a microlens array and a rectangular green luminescent plate which receives light emitted from the excitation light source to emit light in a green wavelength band, and the microlens array is disposed between the excitation light source and the luminescent plate and has a plurality of micro convex lenses which each have a similar shape to the shape of the luminescent material layer are arranged into a matrix, so as to convert light from excitation light source into a plurality of pencils of light to shine them onto the luminescent plate.

10 Claims, 6 Drawing Sheets

(51) Int. Cl.
*F21V 9/16* (2006.01)
*F21V 13/02* (2006.01)
*G02B 27/09* (2006.01)
*F21Y 101/00* (2016.01)

(56) References Cited

U.S. PATENT DOCUMENTS

| | | | |
|---|---|---|---|
| 8,096,668 B2* | 1/2012 | Abu-Ageel | G02B 3/0006 362/296.01 |
| 2003/0007229 A1* | 1/2003 | Handschy | G02B 27/1033 359/237 |
| 2006/0050251 A1* | 3/2006 | Um | G03B 21/2066 353/102 |
| 2006/0126023 A1* | 6/2006 | Tan | G03B 21/10 353/31 |
| 2006/0170883 A1* | 8/2006 | Matsui | G09G 3/3413 353/85 |
| 2007/0019408 A1* | 1/2007 | McGuire, Jr. | F21S 10/007 362/231 |
| 2007/0024977 A1* | 2/2007 | Kawamura | G02B 19/0066 359/554 |
| 2007/0058134 A1* | 3/2007 | Kodama | G02B 27/0961 353/20 |
| 2007/0182939 A1* | 8/2007 | Huibers | H04N 9/315 353/84 |
| 2007/0252954 A1* | 11/2007 | McGuire, Jr. | G02B 27/0101 353/20 |
| 2009/0034284 A1* | 2/2009 | Li | G03B 33/06 362/554 |
| 2009/0213338 A1* | 8/2009 | Inoko | G02B 27/0905 353/38 |
| 2010/0046234 A1* | 2/2010 | Abu-Ageel | G02B 3/0006 362/308 |
| 2010/0110386 A1* | 5/2010 | Handschy | H04N 9/3173 353/20 |
| 2010/0231862 A1* | 9/2010 | Itoh | G02B 27/0994 353/31 |
| 2012/0019788 A1* | 1/2012 | Katou | G02B 26/0833 353/33 |

* cited by examiner 75a  75

75a  75

LIGHT SOURCE UNIT HAVING A MICROLENS ARRAY FOR CONVERTING EXCITATION LIGHT INTO PLURAL LIGHT RAY BUNDLES AND PROJECTOR INCLUDING THE LIGHT SOURCE UNIT

CROSS-REFERENCE TO RELATED APPLICATIONS

This application is a Divisional application of U.S. Ser. No. 13/070,785 filed on Mar. 24, 2011, which is based upon and claims the benefit of priority under 35 USC 119 of Japanese Patent Application No. 2010-067134 filed on Mar. 24, 2010, the entire disclosure of which, including the description, claims, drawings and abstract thereof, is incorporated herein by reference.

BACKGROUND OF THE INVENTION

1. Field of the Invention

The present invention relates to a light source unit having a luminescent plate which becomes luminous based on energy from an excitation light source and a projector which includes the light source unit.

2. Description of the Related Art

In these days, data projectors are used on many occasions as image projection apparatuses which project images including images of screens and video images of personal computers, as well as images based on image data which is stored in memory cards on to a screen. In projectors of the type described above, conventionally, projectors using a high-intensity discharge lamp as a light source have been the mainstream of projectors. However, in recent years, there have been made many developments and proposals on projectors which use, as a light source, alight emitting diode (LED), a laser emitter, a device utilizing organic EL technology or luminescent materials.

For example, Japanese Unexamined Patent Publication No. 2004-341105 (JP-A-2004-341105) proposes a light source unit in which red, green and blue luminescent material layers are laid end to end on a surface of a luminescent plate made up of a light transmissive circular plate and a dichroic filter which transmits ultraviolet light and reflects visible light is disposed on a back side of the luminescent plate and which generates a light-source light of red wavelength band, a light-source light of green wavelength band and a light-source light of blue wavelength band by shining ultraviolet light onto the luminescent material layers from the back side of the luminescent plate.

As has been described above, there exist projectors which utilize, as a light-source light, luminescent light emitted from a luminescent material of a luminescent material layer by shining light emitted from an excitation light source to the luminescent material layer. In these projectors, the quantity of luminescent light emitted from the luminescent material of the luminescent material layer can be increased by increasing the output of the excitation light source. However, when a laser emitter is used as an excitation light source, in the event that the power of a laser beam emitted from the laser emitter is increased, there has been caused a fear that the luminance saturation of the luminescent material or a failure thereof attributed to scorching is generated.

On the other hand, when a laser beam is shone onto the luminescent material layer while being diffused to weaken the power per unit area of the laser beam with the power of the laser bean being increased, the area illuminated by the laser beam gets wider than the area of the portion of the luminescent material layer that is to be illuminated by the laser beam, whereby the laser beam is shone onto positions which lie out of the luminescent material layer, leading to a problem that the utilization efficiency of light emitted from the laser emitter is decreased.

SUMMARY OF THE INVENTION

The invention has been made in view of the problem inherent in the related art and an object thereof is to provide a light source unit which can prevent the luminance saturation of a luminescent material or a failure thereof which is attributed to scorching and increase the utilization efficiency of excitation light so that the luminescent material becomes luminous uniformly, and a projector which includes this light source unit to thereby enable a projection which is free from luminance non-uniformity and remains stable for a long period of time.

According to an aspect of the invention, there is provided a light source unit comprising an excitation light source unit, a luminescent plate including a luminescent material layer which becomes luminous by utilizing light emitted from the excitation light source as exciting light, a microlens array which is interposed between the excitation light source and the luminescent plate and which converts light emitted from the excitation light source into a plurality of pencils of light so as to shine the plurality of pencils of light onto the luminescent plate, and a collective lens which is disposed in proximity to the luminescent plate and which shines the plurality of pencils of light onto the luminescent plate so that center positions of the plurality of pencils of light are superposed one on another on the luminescent material layer.

According to another aspect of the invention, there is provided a projector comprising the light source unit.

According to the aspects of the invention, there can be provided the light source unit which can prevent the luminance saturation of the luminescent material or the failure thereof which is attributed to scorching and increase the utilization efficiency of excitation light so that the luminescent material becomes luminous uniformly, and the projector comprising this light source unit to thereby enable a projection which is free from luminance non-uniformity and remains stable for a long period of time.

BRIEF DESCRIPTION OF THE DRAWINGS

The invention will be understood much sufficiently by reading the following detailed description thereof and referring to the accompanying drawings. However, the detailed description and the accompanying drawings are intended mainly to describe the invention and are not intended to limit the scope thereof. In the accompanying drawings.

DETAILED DESCRIPTION OF THE PREFERRED EMBODIMENT

Figure 1:
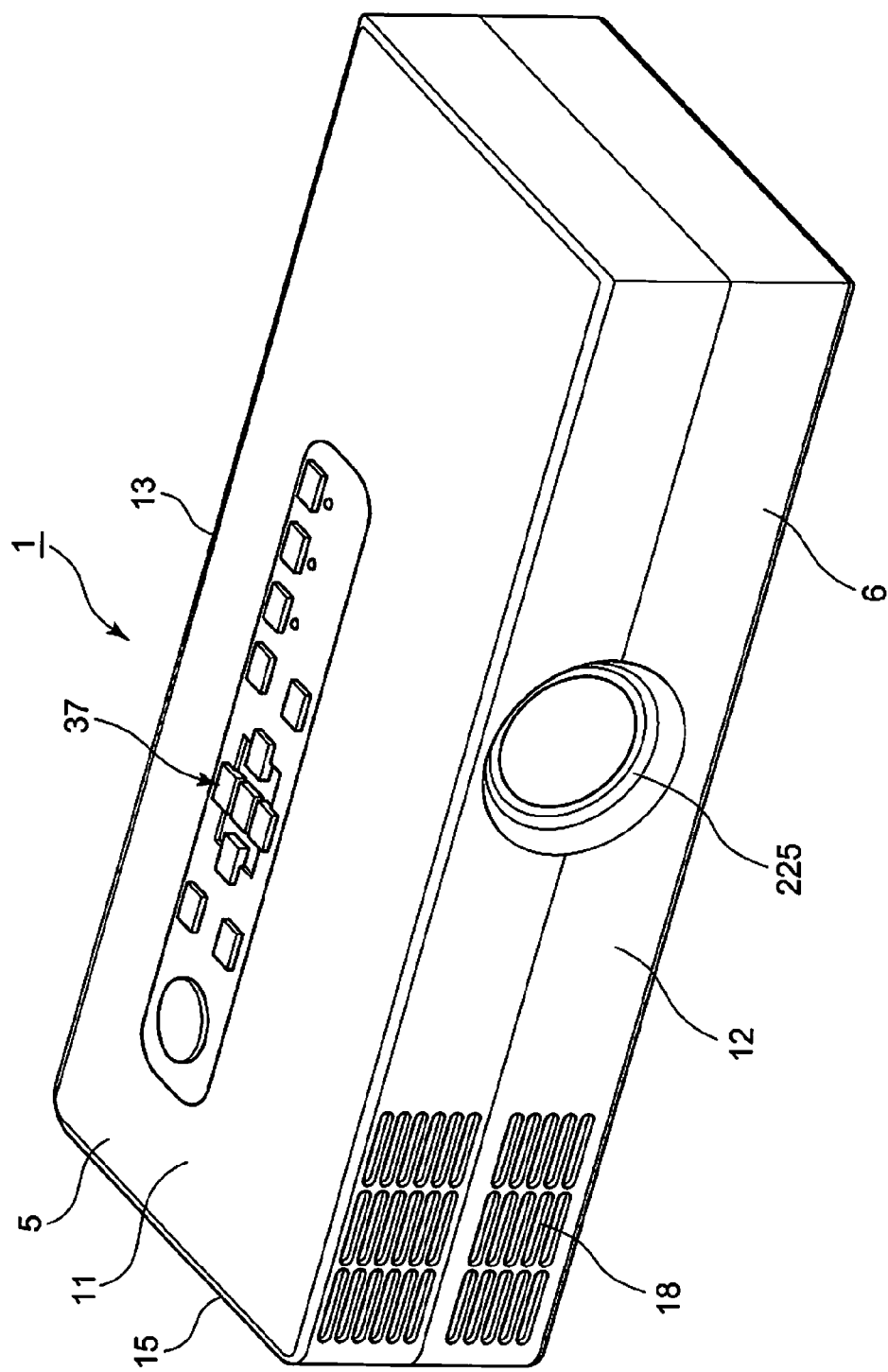
FIG. 1 is a perspective view showing an external appearance of a projector according to an embodiment of the invention.

Hereinafter, a preferred mode for carrying out the invention will be described by use of the accompanying drawings. Although various limitations which are technically preferable in carrying out the invention are imposed on an embodiment which will be described below, the scope of the invention is not limited in any way to the following description and illustrated examples.

A projector 1 according to the invention includes a light source unit 60, a display device 51, a projection-side optical system, a light guiding optical system 170 for guiding light from the light source unit 60 to the display device 51 and for aligning a optical axis of a projection light which is generated in the display device 51 with a optical axis of the projection-side optical system, and a projector control unit for controlling the light source unit 60 and the display device 51.

The light source unit 60 includes an excitation light shining device 70 which includes in turn an excitation light source 71 and a microlens array 75, a luminescent plate 101 which includes a green luminescent material layer which receives light emitted from the excitation light source 71 to emit light in a green wavelength band, a red light source 121 which emits light in a red wavelength band, a blue light source 301 which emits light in a blue wavelength band, and a light source-side optical system 140 which alters optical axes of the light in the red wavelength band, the light in the green wavelength band and the light in the blue wavelength band to the same optical axis and guides the red, green and blue light to a predetermined plane.

The microlens array 75 is interposed between the excitation light source 71 and the luminescent plate 101 and converts light emitted from the excitation light source 71 into a plurality of pencils of light so as to shine them onto the luminescent plate 101. A front surface of the luminescent plate 101 is formed into a reflecting plane, and a rectangular luminescent material layer is laid on the reflecting plane. In addition, the microlens array 75 has a plurality of micro convex lenses 75a having a similar shape to that of the luminescent material layer and arranged in a matrix.

In the light source unit 60, a collective lens 110 is disposed in proximity to the luminescent plate 101, and pencils of light that have passed through the micro convex lenses 75a are shone onto the luminescent material layer by the collective lens 110 so that center positions thereof are superposed one on another on the luminescent material layer.

Hereinafter, an embodiment of the invention will be described in detail by reference to the accompanying drawings.

FIG. 1 is a perspective view showing an external appearance of a projector 1. In this embodiment, left and right with respect to the projector 1 denote, respectively, left and right directions with respect to a projecting direction, and front and rear denote, respectively, front and rear directions with respect to the projecting direction of the projector 1 and a traveling direction of pencils of light.

As is shown in FIG. 1, the projector 1 is a small, substantially rectangular parallelepiped projector 1 which can rest in the hand, and its interior is covered by an upper case and a lower case 6. A lens barrel 225 is disposed substantially in a center of a front panel 12 which is made by fitting together portions of the upper case 5 and the lower case 6 which are situated at a front of a projector casing, and outside air inlet openings 18 are formed in the front panel 12 which is proximity of a right-hand side panel 15.

In addition, a keys/indicators part 37 is provided on an upper panel 11 which is formed by the upper case 5 of the projector housing. Disposed on this keys/indicators part 37 are keys and indicators which include a power supply switch key, a power indicator which informs whether the power supply is on or off, a projection switch key which switches on or off projection, an overheat indicator which informs that the light source unit, the display device or a control circuit overheats. Further, provided in a back panel 13 and the right-hand side panel 15 which are formed by fitting together portions of the upper case 5 and the lower case 6 which are situated at the rear and side of the projector housing are various types of terminals such as USB terminals, a power supply adapter plug, memory card insertion slots and the like.

Figure 2:
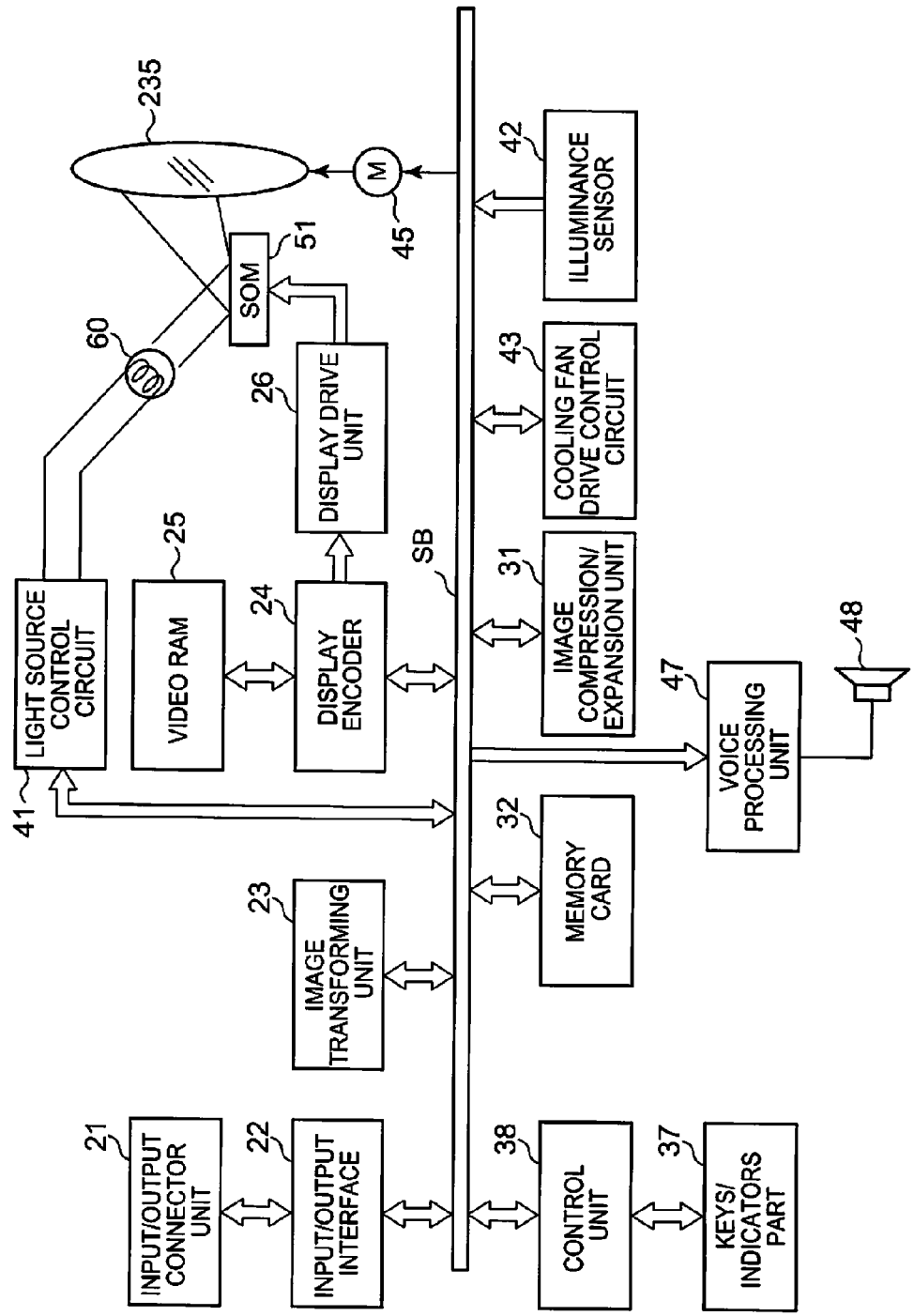
FIG. 2 is a functional circuit block diagram showing functional blocks of the projector according to the embodiment of the invention.

Next, a projector control unit of the projector 1 will be described by use of a functional block diagram in FIG. 2. The projector control unit includes a control unit 38, an input/output interface 22, an image transforming unit 23, a display encoder 24, a display drive unit 26 and the like. The control unit 38 governs the control of operations of respective circuitries within the projector 1, and the control unit 38 is made up of a CPU as an arithmetic unit, a ROM which stores operation programs such as various types of settings in a fixed fashion and a RAM which is used as a work memory.

The projector control unit sends image signals of various standards that are inputted from an input/output connector unit 21 to the image transforming unit 23 via the input/output interface 22 and a system bus (SB) where the image signals are transformed into image signals in a predetermined unified format which is suitable for display and thereafter, the image signals so transformed are outputted to the display encoder 24.

In addition, the display encoder 24 deploys the image signals inputted thereinto on a video RAM 25 for storage and generates a video signal from the contents stored in the video RAM 25, outputting the video signal so generated to the display drive unit 26.

The display drive unit 26 functions as a display device controller and drives a display device 51 which is a spatial optical modulator (SOM) at an appropriate frame rate in accordance with image signals outputted from the display encoder 24. In this projector 1, pencils of light which are emitted from a light source unit 60, that is, pencils of light which are collected to a predetermined plane by a light source-side optical system 140 of the light source unit 60 are shone onto the display device 51 via a light guiding optical system 170 to thereby form an optical image by reflected light reflected at the display device 51 which is controlled to be driven by the display drive unit 26. The image so formed is projected on to a screen, not shown, for display via a projection-side optical system, which will be described later. A movable lens group 235 of the projection-side optical system is driven by a lens motor 45 for zooming or focusing.

In addition, an image compression/expansion unit 31 performs an operation in which when in a reproducing mode, the image compression/expansion unit 31 reads out image data recorded on a memory card 32 and expands individual image data which make up a series of dynamic images frame by frame. Then, the image data is outputted to the display encoder 24 via the image transforming unit 23 so as to enable the display of dynamic images on the basis of the image data stored on the memory card 32.

Operation signals generated at the keys/indicators part 37 which is provided on the upper case 5 are sent out directly to the control unit 38. A voice processing unit 47 is connected to the control unit 38 via a system bus (SB). This voice processing part 47 includes a sound source circuit such as a PCM sound source. When in a projection mode and a reproducing mode, the voice processing unit 47 converts voice data into analog signals and drives a speaker 48 to output loudly sound or voice based on the voice data.

Additionally, the control unit 38 controls a light source control circuit 41 which is configured as alight source control unit. This light source control circuit 41 controls individually the emission of light by an excitation light shining unit, a red light source unit and a blue light source unit of the light source unit 60 so that a light source light in a predetermined wavelength band which is required when generating a image is emitted from the light source unit. Further, the control unit 38 causes a cooling fan drive control circuit 43 to detect temperatures through a plurality of temperature sensors which are provided in the light source unit 60 so as to control rotating speeds of a cooling fan based on the results of the temperature detection.

Further, the projector control unit includes an illuminance sensor 42 as an illuminance measuring unit for measuring an illuminance of light emitted from the light source unit 60. Then, the control unit 38 regulates voltages applied to the respective light sources of the light source unit 60 based on information regarding outputs of light in respective wavelength bands which are sent out from the illuminance sensor 42 and maintains an original luminance balance when the projector 1 is shipped from a factory.

Figure 3:
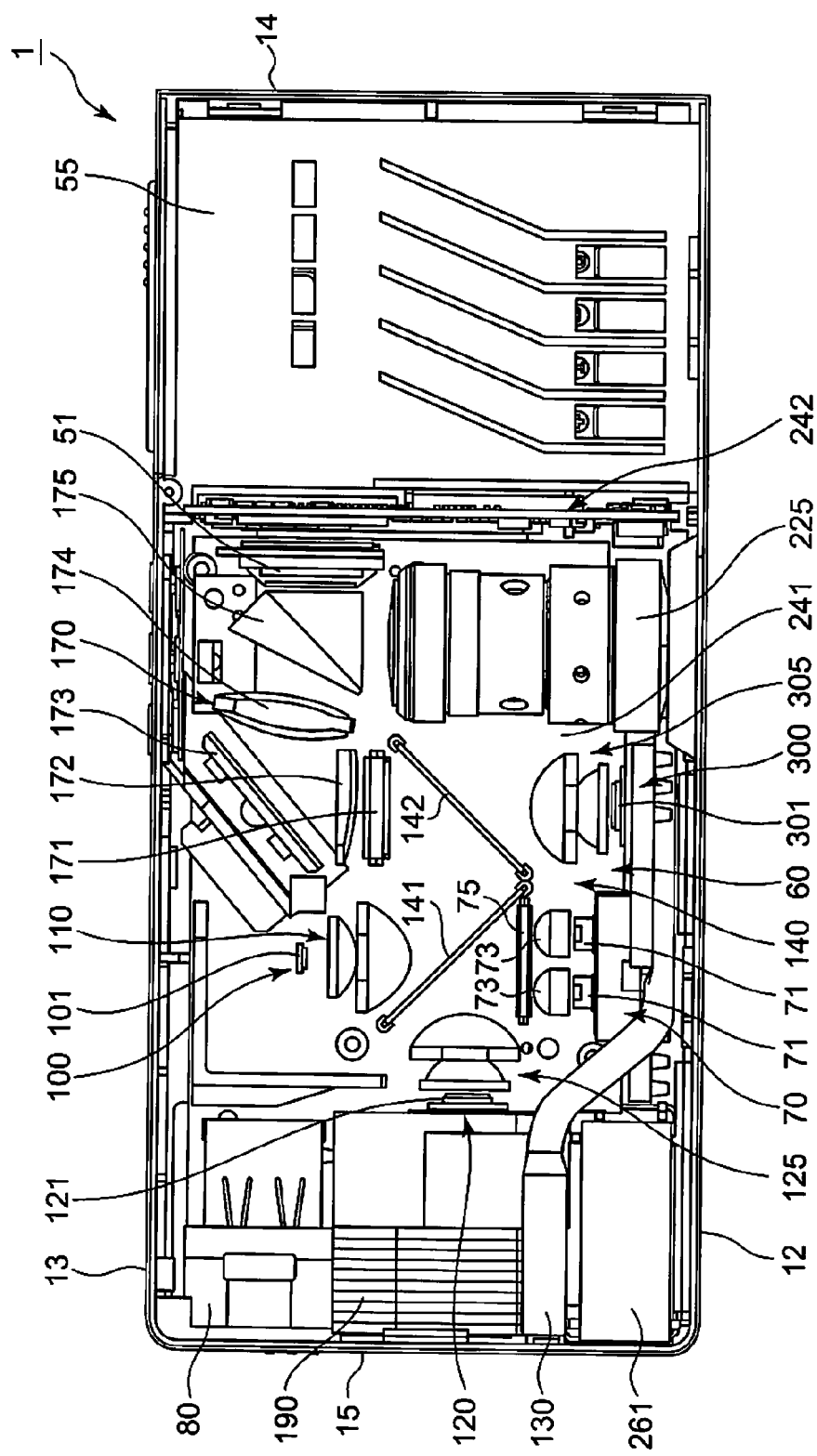
FIG. 3 is an exemplary plan view showing an internal construction of the projector according to the embodiment of the invention with an upper case removed.

Next, an internal construction of the projector 1 will be described. FIG. 3 is an exemplary plan view showing an internal construction of the projector 1. As is shown in FIG. 3, the projector 1 includes the light source unit 60 at a central portion, the lens barrel 225 which incorporates a projection-side optical system to the left of the light source unit 60 and a battery 55 which lies between the lens barrel 225 and a left-hand side panel 14. In addition, the projector 1 includes the display device 51 such as a DMD disposed parallel to the left-hand side panel 14 in a position lying in proximity to the battery 55 between the lens barrel 225 and the back panel 13. Further, the projector 1 includes a main control circuit board 241 below the light source unit 60 and a power supply control circuit board 242 between the lens barrel 225 and the battery 55.

In addition, the projector 1 includes light source unit and the light guiding optical system 170 between the lens barrel 225 and the back panel 13. The light guiding optical system 170 shines light emitted from the light source unit 60 onto the display device 51 and makes an optical axis of light reflected at the display device 51 coincide with an optical axis of the projection-side optical system for emission towards the projection-side optical system. The projector 1 further includes a power supply connector 80, a heatsink 190 for a red light source 121, which will be described later, a heat pipe 130 for guiding heat generated in an excitation light source 71 and a blue light source 301, both of which will be described later, to the heatsink 190, and a cooling fan 261 sequentially in that order from the back panel 13 between the light source unit 60 and the right-hand side panel 15.

The light source unit 60 includes an excitation light shining unit 70 which is disposed in proximity to the cooling fan 261 and the front panel 12, a blue light source unit 300 which is disposed between the excitation light shining unit 70 and the lens barrel 225, a luminescent plate 101 which is disposed in proximity to the light source connector 80 and the back panel 13, a red light source unit 120 which is disposed between the excitation light shining unit 170 and the luminescent plate 101, and a light source-side optical system 140 which guides light in red, green and blue wavelength bands emitted from the light source unit 60 to the light guiding optical system 170.

The excitation light shining unit 70 includes two excitation light sources 71 whose optical axes are parallel to the left-hand side panel 14, two collimator lenses 73 which are disposed on the optical axes of the excitation light sources 72 and a microlens array 75 which is disposed in front of the collimator lenses 73. This excitation light source 71 is a blue laser emitter and emits a laser beam in a blue wavelength band towards the luminescent plate 101. In addition, the excitation light source 71 is in contact with the heat pipe 130 via a circuit board for the excitation light source 71 and is cooled by the heatsink 190 via this heat pipe 130. The collimator lenses 73 convert light emitted from the excitation light source 71 into parallel pencils of light to be shone onto the microlens array 75. The microlens array 75 will be described in detail later.

The luminescent plate 101 has a rectangular shape and a surface of the luminescent plate 101 is mirror finished. A rectangular green luminescent material layer is laid on the mirror finished surface. This green luminescent material layer is formed of a binder of a silicone resin having high heat resistance and transmissivity and a green luminescent material which is dispersed uniformly in the binder. Then, the luminescent plate 101 generates green luminescent light by use of a laser bean emitted from the excitation light source 71 as excitation light and emits this green luminescent light from the same plane as the incident plane of the excitation light. The green luminescent material layer of the luminescent plate 101 has a similar shape to that of the display device 151, and a sectional shape of a pencil of light emitted from the green luminescent material layer approximates to the shape of the display device 51.

The red light source unit 120 includes the red light source 121 which optical axis is parallel to the front panel 12. This red light source 121 is a red light emitting diode and is cooled by the heatsink 190. The blue light source unit 300 includes the blue light source 301 whose optical axis is parallel to the excitation light source 71. This blue light source 301 is a blue light emitting diode and is cooled by the heat sink 190 via the heat pipe 130.

The light source-side optical system 140 includes a collective lens 110 which collects light emitted from the excitation shining unit 70 and luminescent light emitted from the luminescent plate 101, a collective lens 125 which collects light emitted from the red light source 121, a collective lens 305 which collects light emitted from the blue light source 301, a first dichroic mirror 141 which transmits excitation light from the excitation light shining unit 70 and light from the red light source unit 120 and reflects luminescent light emitted from the luminescent plate 101, and a second dichroic mirror 142 which reflects light from the red light source unit 120 and luminescent light emitted from the luminescent plate 101 and transmits light emitted from the blue light source unit 300.

The collective lenses 110, 125, 305 are each configured as a single collective lens by combining a plurality of lenses. In addition, the first dichroic mirror 141 is disposed in a position where the optical axis of the excitation light shining unit 70 and the optical axis of the red light source unit 120 intersect each other. Further, the second dichroic mirror 142 is disposed in a position where the optical axis of the red light source unit 120 and the optical axis of the blue light source unit 300 intersect each other.

In a light source unit in which a luminescent material is caused to be luminous by use of light emitted from a laser emitter as excitation light, pencils of light emitted from the excitation light source, which is a laser emitter, have a high directivity and a very strong peak power, and therefore, there has been caused a fear that such pencils of light are shone strongly onto part of the luminescent material layer to thereby cause a luminance saturation or a failure due to scorching. Then, in the light source unit 60 of this embodiment, by disposing the microlens array 75 in front of the excitation light source 71 in the way described above, the laser beam having the strong peak power is converted into pencils of light each having the similar sectional shape to the luminescent material layer which are then shone onto the whole of the luminescent plate 101 substantially uniformly.

Figure 4A:
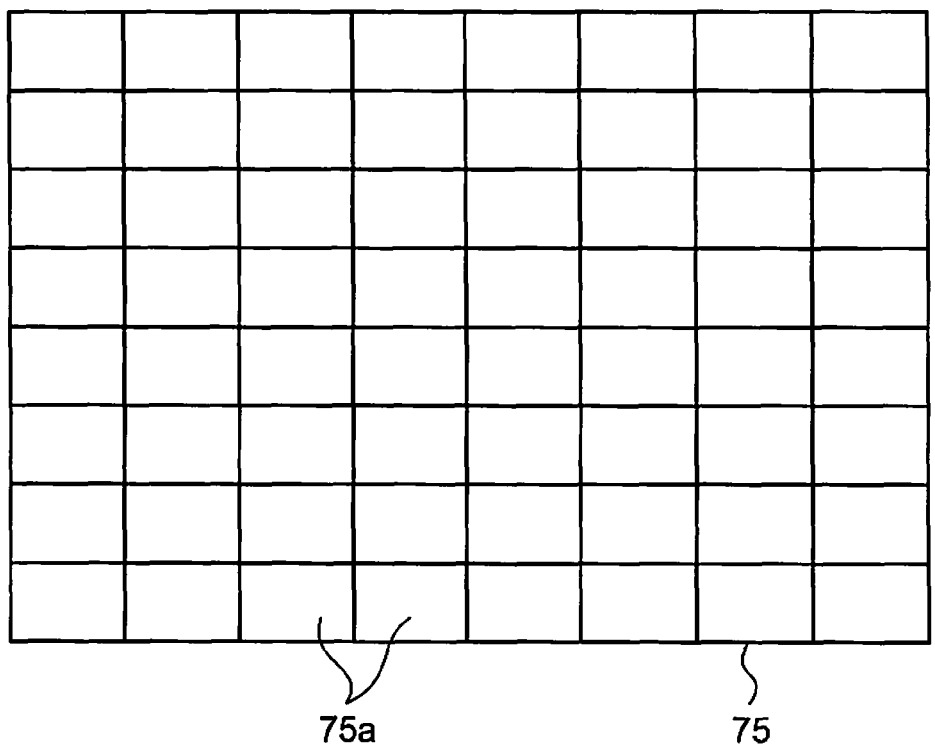
FIG. 4A is a front view of a microlens array according to the embodiment of the invention.
Figure 4B:
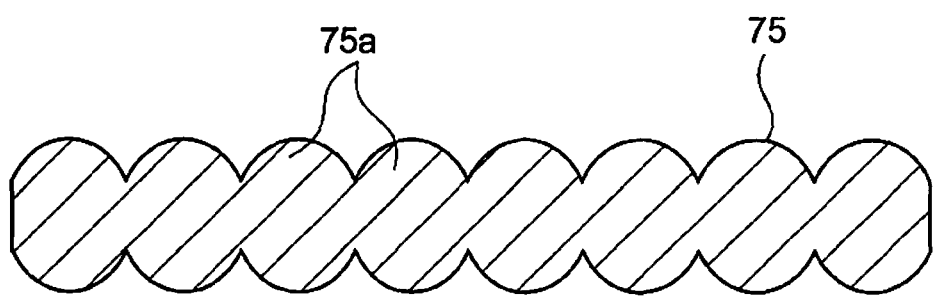
FIG. 4B is a sectional view of the microlens array according to the embodiment of the invention.

FIG. 4 shows an exemplary front view and an exemplary sectional view of the microlens array 75. As is shown in FIGS. 4A and 4B, in the microlens array 75 of the excitation light shining unit 70, a plurality of micro convex lenses 75a are arranged into a matrix. In addition, each micro convex lens 75a has a substantially similar shape to the shape of the green luminescent material layer of the luminescent plate 101. Pencils of light which are incident on the microlens array 75 are converted into a plurality of pencils of light by the micro convex lenses 75a, and a pencil of light incident on each micro convex lens 75a is converted into a pencil of light having a rectangular section by the micro convex lens 75a.

Figure 5:
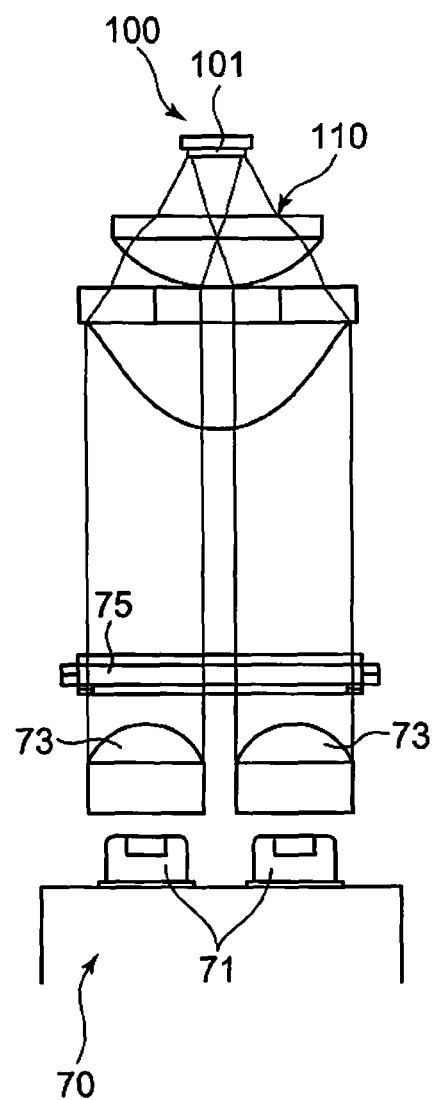
FIG. 5 is an explanatory drawing regarding flows of pencils of light in an exciting light shining unit and a luminescent plate according to the embodiment of the invention.
Figure 6:
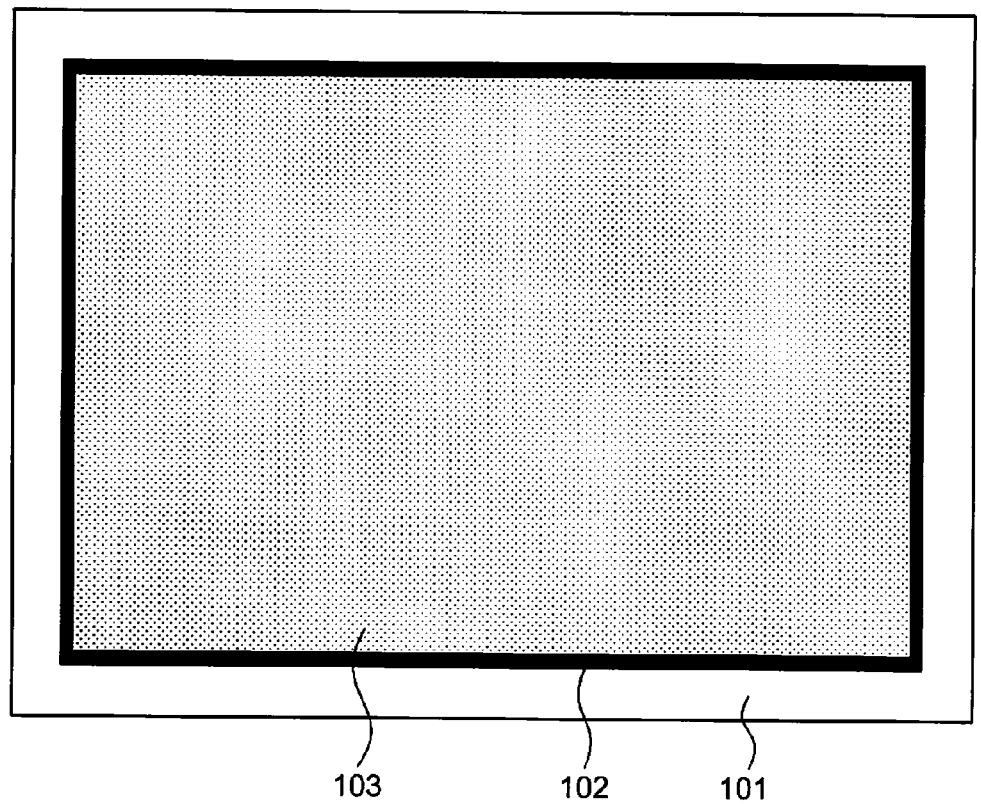
FIG. 6 is an explanatory drawing showing an exciting light luminance distribution of the luminescent plate according to the embodiment of the invention.

In addition, as is shown in FIG. 5, the excitation light is converted into a plurality of pencils of light having the rectangular section by the microlens array 75, and the pencils of light are then collected by the collective lens 110 so as to be shone onto the green luminescent material layer of the luminescent plate 101. Namely, the pencils of light that have passed through the micro convex lenses 75a are collected by the collective lens 110 so that their center positions are superposed one on another on the green luminescent material layer, whereby the plurality of pencils of light having the rectangular section are shone onto the whole of the green luminescent material layer one on another. In addition, FIG. 6 shows a distribution 103 of excitation light shone via the microlens array 75. Since each pencil of light is given the substantially similar section to the shape of the green luminescent material layer 102, the excitation light is shone onto a wide range on the green luminescent material layer 102 with a uniform intensity. Consequently, the pencils of light like the laser beam having the strong peak power can be shone onto the wide range of the green luminescent material layer 102 with the uniform intensity, and therefore, the generation of a luminance saturation or a failure due to scorching of the luminance material can be prevented, thereby making it possible to allow the luminescent material to become luminous uniformly.

In the light source unit 60 of the embodiment, although the single microlens array 75 is disposed in front of the two excitation light sources 71, the invention is not limited thereto. For example, a microlens array 75 may be disposed in front of each microlens array 75. Alternatively, the light source unit 6 may be made up of a single excitation light source 71 having a high luminance and a single microlens array 75.

The light guiding optical system 170 includes a microlens array 171, an optical axis alteration mirror 173 for altering an axis of light emitted from the light source unit 60 towards the display device 51, a collective lens 172 which is interposed between the optical axis alteration mirror 173 and the microlens array 171, a collective lens 174 which is positioned on the optical axis which is altered by the optical axis alteration mirror 173 and a prism 175.

The microlens array 171 in this light guiding optical system 170 converts the pencils of light which are emitted from the red light source 121, the blue light source 301 and the luminescent plate 101 in the light source unit 60 into a plurality of pencils of light having a rectangular section which matches the shape of the display device 51, and the pencils of light are then collected by the microlens array 171 or the collective lens so that center positions of the pencils of light are superposed one on another on the display device 51 whereby the pencils of light are mixed so that the pencils of light are converted into a pencil of light having a uniform intensity distribution. Namely, the microlens array 171 functions as a light guiding unit such as a light tunnel or a glass rod which converts pencils of light which are incident thereon into a pencil of light having a rectangular section and a uniform intensity distribution. The prism 175 functions as a condenser lens which shines light-source light onto the display device 51 and an optical axis alteration unit which alters an optical axis of projection light generated in the display device 51 so as to coincide with an optical axis of the projection-side optical system incorporated in the lens barrel 225.

The projection-side optical system incorporated in the lens barrel 225 includes a fixed lens group and a movable lens group and realizes a zooming function and a focusing function by causing lenses of the movable lens group to operate in an optical direction by controlling the lens motor 45.

In addition, the battery 55 is a drive power supply for the projector 1 and constitutes a secondary battery which can be charged by being connected to a commercial power supply. A secondary battery such as a lithium-ion battery or a nickel-hydrogen battery can be applied to the battery 55. Then, images can be projected by the projector 1 of the embodiment by the electric power of the battery 55 without being connected to a power supply via an electric cord.

In this way, in the projector 1 of the embodiment, the excitation light having the uniform intensity can be shone onto the wide range on the luminescent material layer of the luminescent plate 101 by disposing the microlens array 75 in front of the excitation light source 71. Consequently, the generation of a luminance saturation or a failure due to scorching of the luminescent material can be prevented, which enables the luminescent material to become luminous more uniformly, thereby making it possible to provide the projector 1 which enables the stable projection free from luminance non-uniformity for a long period of time.

In addition, the pencils of light having the circular section which are emitted from the excitation light source 71 can be converted into the plurality of pencils of light having the rectangular section by forming the microlens array 75 by arranging the plurality of micro convex lenses 75a into the matrix which each have the similar shape to the shape of the luminescent material layer. Consequently, compared with a situation in which pencils of light having a circular section are shone onto a luminescent material layer having a rectangular shape, the excitation light can be shone onto the wide range on the luminescent material layer, thereby making it possible to increase the utilization efficiency of the luminescent material. In this embodiment, while the luminescent material layer 102 and the micro convex lenses 75a have the rectangular shapes, their shapes are not limited to the rectangular shapes, provided that the shapes of the luminescent material layer and the micro convex lenses are similar to each other as has been described above. For example, the luminescent material layer 102 and the micro convex lenses 75a may have circular shapes or polygonal shapes. Namely, any shapes can be adopted, provided that light emitted from the excitation light source 71 may be converted into pencils of light having the same shape as that of the luminescent material layer.

By collecting the plurality of pencils of light generated in the microlens array 75 so that their center positions are superposed one on another on the luminescent material layer by the collective lens 110, the plurality of pencils of light each having a weak power can be shone onto the luminescent material layer in a superposed fashion. Therefore, light having a strong power can be prevented from being shone onto only a specific area of the luminescent material layer, whereby the generation of a luminance saturation of or a failure due to scorching of the luminescent material can be prevented, thereby making it possible to make the luminescent material become luminous further uniformly.

In addition, since the light source unit 60 of the embodiment includes the red light source 121 and the blue light source 301 in addition to the excitation light source 71 and the luminescent plate 101, the light source unit 60 can generate the light in the red wavelength band, the light in the green wavelength band and the light in the blue wavelength band, which constitute the three primary colors of light, whereby the light source unit 60 can be used as alight source unit in the projector 1 which can project color images.

In the projector 1 of the embodiment, while only the light in the green wavelength band is made to be generated by the luminescent plate 101, the invention is not limited thereto. A configuration may be adopted in which the light in the red wavelength band or the light in the blue wavelength band is generated by making use of luminescent plates. As this occurs, too, as in the case with this embodiment, by disposing the microlens array 75 in front of the excitation light source 71, the generation of a luminance saturation of or a failure due to scorching of the luminescent material can be prevented, and the utilization of the luminescent material can be increased, thereby making it possible to make the luminescent material become luminous further uniformly.

In addition, since the luminescent material does not have to be rotated in order to prevent the generation of a luminance saturation of or a failure due to scorching of the luminescent material, it becomes possible to obviate the necessity of a motor for rotationally driving the luminescent material in order to prevent the generation of a luminance saturation of or a failure due to scorching of the luminance material, whereby the light source unit 60 and the projector 1 can be made smaller in size.

In addition, the invention is not limited to the embodiment that has been described heretofore and can be modified variously in steps of carrying out the invention without departing from the spirit and scope of the invention. Additionally, the invention may be carried out with as many functions as possible in the functions which are described as being executed in the embodiment described above combined together as required. The embodiment includes various steps, and various inventions can be extracted by combining the plurality of disclosed constituent requirements as required. For example, in the event that an advantage can be obtained even though some constituent requirements are deleted from the whole constituent requirements, the resulting configuration in which some of the constituent requirements are so deleted can be extracted as the invention.

What is claimed is:

1. A light source unit comprising:
    an excitation light source;
    a blue light source which emits light in a blue wavelength band;
    a luminescent plate comprising a luminescent material layer which emits luminescent light by receiving light emitted from the excitation light source;
    a microlens array which is disposed between the excitation light source and the luminescent plate and which converts light emitted from the excitation light source into a plurality of pencils of light so as to be shone onto the luminescent plate; and
    a collective lens which is disposed in proximity to the luminescent plate and which shines the plurality of pencils of light so that their center positions are superposed one on another on the luminescent material layer; and
    a dichroic mirror which makes an optical axis of the blue light source and an optical axis of the luminescent light coincide with each other on the same optical axis,
    wherein a surface of the luminescent plate is formed into a reflecting plane and the luminescent material layer having a predetermined shape is laid on the luminescent plate, and
    wherein the microlens array is made up of a plurality of micro convex lenses which each have a similar shape to the shape of the luminescent material layer and which are arranged into a matrix.

2. A light source unit as set forth in claim 1, wherein the luminescent material layer has a rectangular shape.

3. A light source unit as set forth in claim 1, further comprising:
    an excitation light shining unit comprising the excitation light source and the microlens array;
    wherein the luminescent plate comprises a green luminescent material layer which receives light emitted from excitation light source so as to emit light in a green wavelength band; and
    wherein the light source unit further comprises:
    a red light source which emits light in a red wavelength band;
    a blue light source which emits light in a blue wavelength band; and
    a light source-side optical system which alters optical axes of the light in the red wavelength band, the light in the green wavelength band and the light in the blue wavelength band into the same optical axis so as to guide the light in the red, green and blue wavelength bands to a predetermined plane.

4. A light source unit as set forth in claim 2, further comprising:
    an excitation light shining unit comprising the excitation light source and the microlens array;
    wherein the luminescent plate comprises a green luminescent material layer which receives light emitted from excitation light source so as to emit light in a green wavelength band; and wherein the light source unit further comprises:
a red light source which emits light in a red wavelength band;
a blue light source which emits light in a blue wavelength band; and
a light source-side optical system which alters optical axes of the light in the red wavelength band, the light in the green wavelength band and the light in the blue wavelength band into the same optical axis so as to guide the light in the red, green and blue wavelength bands to a predetermined plane.

5. A projector comprising:
the light source unit set forth in claim 1;
a display device;
a projection-side optical system;
a light guiding optical system which guides light emitted from the light source unit to the display device and make the projection light generated in the display device coincide with an optical axis of the projection-side optical system; and
a projector control unit for controlling the light source unit and the display device.

6. A light source unit comprising:
an excitation light source;
a blue light source which emits light in a blue wavelength band;
a luminescent plate comprising a luminescent material layer which emits luminescent light by receiving light emitted from the excitation light source;
a microlens array which is disposed between the excitation light source and the luminescent plate and which converts light emitted from the excitation light source into a plurality of pencils of light so as to be shone onto the luminescent plate; and
wherein a surface of the luminescent plate is formed into a reflecting plane and the luminescent material layer having a predetermined shape is laid on the luminescent plate, and
wherein the microlens array is made up of a plurality of micro convex lenses which each have a similar shape to the shape of the luminescent material layer and which are arranged into a matrix.

7. A light source unit as set forth in claim 6, wherein the luminescent material layer has a rectangular shape.

8. A light source unit as set forth in claim 6, further comprising:
an excitation light shining unit comprising the excitation light source and the microlens array;
wherein the luminescent plate comprises a green luminescent material layer which receives light emitted from excitation light source so as to emit light in a green wavelength band; and
wherein the light source unit further comprises:
a red light source which emits light in a red wavelength band;
a blue light source which emits light in a blue wavelength band; and
a light source-side optical system which alters optical axes of the light in the red wavelength band, the light in the green wavelength band and the light in the blue wavelength band into the same optical axis so as to guide the light in the red, green and blue wavelength bands to a predetermined plane.

9. A light source unit as set forth in claim 7, further comprising:
an excitation light shining unit comprising the excitation light source and the microlens array;
wherein the luminescent plate comprises a green luminescent material layer which receives light emitted from excitation light source so as to emit light in a green wavelength band; and
wherein the light source unit further comprises:
a red light source which emits light in a red wavelength band;
a blue light source which emits light in a blue wavelength band; and
a light source-side optical system which alters optical axes of the light in the red wavelength band, the light in the green wavelength band and the light in the blue wavelength band into the same optical axis so as to guide the light in the red, green and blue wavelength bands to a predetermined plane.

10. A projector comprising:
the light source unit set forth in claim 6;
a display device;
a projection-side optical system;
a light guiding optical system which guides light emitted from the light source unit to the display device and make the projection light generated in the display device coincide with an optical axis of the projection-side optical system; and
a projector control unit for controlling the light source unit and the display device.

* * * * *